United States Patent
Timcenko

(10) Patent No.: US 7,439,972 B2
(45) Date of Patent: Oct. 21, 2008

(54) METHOD OF GENERATING A COMPUTER READABLE MODEL

(75) Inventor: Olga Timcenko, Billund (DK)

(73) Assignee: Lego A/S, Billund (DK)

( * ) Notice: Subject to any disclaimer, the term of this patent is extended or adjusted under 35 U.S.C. 154(b) by 388 days.

(21) Appl. No.: 10/527,295

(22) PCT Filed: Oct. 9, 2003

(86) PCT No.: PCT/DK03/00674

§ 371 (c)(1),
(2), (4) Date: Aug. 15, 2005

(87) PCT Pub. No.: WO2004/034333

PCT Pub. Date: Apr. 22, 2004

(65) Prior Publication Data

US 2006/0106815 A1    May 18, 2006

(30) Foreign Application Priority Data

Oct. 11, 2002   (DK) .............................. 2002 01549

(51) Int. Cl.
*G06T 17/00* (2006.01)
(52) U.S. Cl. .................................................. 345/420
(58) Field of Classification Search ......... 345/419–420; 703/6–7
See application file for complete search history.

(56) References Cited

U.S. PATENT DOCUMENTS

| | | | |
|---|---|---|---|
| 4,275,449 A * | 6/1981 | Aish .............................. 703/1 |
| 5,293,479 A | 3/1994 | Quintero et al. | |
| 6,104,403 A | 8/2000 | Mukouchi et al. | |
| 6,741,245 B1 * | 5/2004 | Marks et al. ................. 345/420 |
| 6,889,176 B1 * | 5/2005 | Buttolo et al. ................. 703/1 |
| 2002/0018061 A1 | 2/2002 | Gantt | |
| 2002/0196250 A1 * | 12/2002 | Anderson et al. ........... 345/420 |

FOREIGN PATENT DOCUMENTS

| | | |
|---|---|---|
| EP | 241071 | 10/1987 |
| WO | WO-00/43959 | 7/2000 |
| WO | WO-00/62137 | 10/2000 |

* cited by examiner

*Primary Examiner*—Mark Zimmerman
*Assistant Examiner*—Andrew Yang
(74) *Attorney, Agent, or Firm*—Day Pitney LLP

(57) ABSTRACT

A method of generating a computer readable model of a geometrical object constructed from a plurality of interconnectable construction elements, wherein each construction element has a number of connection elements for connecting the construction element with another construction element. The method comprises encoding a first and a second one of the construction elements as corresponding data structures, each representing the connection elements of the corresponding construction element, and each of the connection elements having associated with it a predetermined connection type. The method further comprises determining a first connection element of the first construction element and a second connection element of the second construction element located in a predetermined proximity of each other; and retrieving connectivity information of the corresponding connection types of the first and second connection elements indicative of whether the first and second connection elements provide a connection between the first and the second construction element.

20 Claims, 10 Drawing Sheets

| C[0,0] = 1/4TG | C[0,1] = EG | C[0,2] = 1/2TG | C[0,3] = EG | C[0,4] = 1/2TG | C[0,5] = EG | C[0,6] = 1/2TG | C[0,7] = EG | C[0,8] = 1/4TG |
|---|---|---|---|---|---|---|---|---|
| C[1,0] = EG | C[1,1] = S | C[1,2] = 2EG | C[1,3] = S | C[1,4] = 2EG | C[1,5] = S | C[1,6] = 2EG | C[1,7] = S | C[1,8] = EG |
| C[2,0] = 1/2TG | C[2,1] = 2EG | C[2,2] = TG | C[2,3] = 2EG | C[2,4] = TG | C[2,5] = 2EG | C[2,6] = TG | C[2,7] = 2EG | C[2,8] = 1/2TG |
| C[3,0] = EG | C[3,1] = S | C[3,2] = 2EG | C[3,3] = S | C[3,4] = 2EG | C[3,5] = S | C[3,6] = 2EG | C[3,7] = S | C[3,8] = EG |
| C[4,0] = 1/4TG | C[4,1] = EG | C[4,2] = 1/2TG | C[4,3] = EG | C[4,4] = 1/2TG | C[4,5] = EG | C[4,6] = 1/2TG | C[4,7] = EG | C[4,8] = 1/4TG |

Fig. 5a

| C[0,0] = EC | C[0,1] = E | C[0,2] = E | C[0,3] = E | C[0,4] = EC |
|---|---|---|---|---|
| C[1,0] = E | C[1,1] = AS | C[1,2] = SP | C[1,3] = AS | C[1,4] = E |
| C[2,0] = E | C[2,1] = SP | C[2,2] = 3/4EC | C[2,3] = E | C[2,4] = EC |
| C[3,0] = E | C[3,1] = AS | C[3,2] = E | | |
| C[4,0] = EC | C[4,1] = E | C[4,2] = EC | | |

Fig. 5b

METHOD OF GENERATING A COMPUTER READABLE MODEL

FIELD OF THE INVENTION

This invention relates to the field of computer aided modeling of a virtual reality by means of predefined geometrical elements.

BACKGROUND OF THE INVENTION

Computer aided modeling of a virtual reality is the task of creating a model of a geometrical object, interpreting the model, manipulating the model, and otherwise handling a model of a geometrical object in a computer system.

From a first point of view, modeling of a virtual reality is an interesting topic in that it makes it possible to visualize ideas before they are actually implemented in the real world. If the virtual reality model is sufficiently easy to modify much time can be saved in the process of developing and refining a geometrical object compared to a situation where the same process should have been carried in the real world. A simple task of painting an object in the real world may easily take several hours, whereas the computer can apply a new colour to visualize of a model within milliseconds or seconds From a second point of view, modeling of a virtual reality is interesting in that it makes it possible to create a model of an object that exists in the real world and via a computer visualize and manipulate the model in some sense. Thus the model of the object in the real world can be stored for different purposes, e.g. for advanced documentation purposes.

Although there exists a huge amount of possible applications for computer aided virtual reality modeling, a special application is to use virtual reality modeling for entertainment or education.

Various types of modeling concepts of physical construction toy sets are known as such. Especially, concepts using modular or semi-modular concepts were, and are, very popular. Typically, these concepts provide a set of pre-manufactured elements that can be interconnected with each other in some predetermined way according to modules of the pre-manufactured elements. The pre-manufactured elements resembles well-known objects adapted to a specific modeling task. Thus in e.g. building a model of a house the elements may resemble wall bricks, roof tiles, doors, and windows. The object of selecting the elements in this way is that the work involved with the building of a model of a house is reduced significantly compared to a situation where all details of the house is to be defined each time a new model should be made. However, the complete freedom in building a house or another object is traded off for the simplicity of building the model.

This approach of having predefined elements is well known in the art of computer aided virtual reality modeling. Also, the concept of having modular elements that can be interconnected with each other is well known. But when it comes to representation in a computer of such models, the expediency of the concept of having predefined elements and modular systems is not fully accomplished in the prior art.

As long as computers have been used for computer aided design and modeling, a task requiring a large computational effort has been the visualization and manipulation of a model, including calculation of how the model should appear. One of the reasons why is that the complexity and refinements of the virtual reality models have been extended to follow the ever recent available computer technology and computationally power.

When it comes to transfer and interchange of data representing a model, the drawbacks of the complexity and refinements of the virtual reality models appear very clearly. Now some type of external unit in the form of a storage unit or a computer communication network is connected to the computer and thus extends the signal path for storing, loading and/or transmitting, receiving a model. Typically, such signal paths have a relatively low bandwidth compared to signal paths within a single computer. Thus an efficient scheme for representing a model is needed.

In particular, in the context of generating a model of predefined elements or construction elements which may be mutually interconnected via connection elements, such as connectors and corresponding receptors, a general problem arises of determining whether or not two virtual construction elements are connectable when placed in a certain position relative to each other. Connectivity information is important information in order to generate realistic models of physical objects, for example in order to ensure that a virtual model does not comprise any element which floats above a surface without being connected to a supporting part of the modelled object In most real-world constructions sets a large variety of different construction elements exist which may be interconnected in many different ways.

Hence it is an object of the present invention to provide a method of generating a computer readable model of a geometrical object wherein a variety of different construction elements can be interconnected.

It is a further object of the invention to provide a method of generating a computer readable model of a geometrical object wherein the construction elements may be interconnected in a variety of possible ways.

SUMMARY OF THE INVENTION

The above and other problems are solved by a method of generating a computer readable model of a geometrical object constructed from a plurality of interconnectable construction elements, wherein each construction element has a number of connection elements for connecting the construction element with another construction element, the method comprising encoding a first and a second one of the plurality of construction elements as corresponding first and second data structures, each representing the connection elements of the corresponding construction element, and each of the connection elements having associated with it one of a plurality of predetermined connection types;

determining a first connection element of the first construction element and a second connection element of the second construction element located in a predetermined proximity of each other; and retrieving connectivity information of the corresponding connection types of the first and second connection elements indicative of whether the first and second connection elements provide a connection between the first and the second construction element.

It is an advantage of the invention that it provides a model structure and a representation of the model structure that is expedient for representing objects composed of modular toy construction elements or elements.

It is a further advantage of the invention that it provides a method for modeling connections of a large variety of construction elements.

It is yet a further advantage of the invention that it provides a method for modeling connections of a large variety of different connection elements, such as different types of knobs, holes, tubes, hinges, edges, shafts, etc. By providing a plurality of connection elements having connection types, a representation of the connection properties of a construction element is provided which is independent of the exact geometrical shape of the actual connectors.

In particular, it is an advantage that a method for modeling connections of a large variety of different connection elements is provided which is independent of the appearance of the physical connection elements and their configuration.

Hence, a large set of different predefined construction elements including different types of connection elements, may be modeled.

The term construction element comprises any suitable type of constructional element having connection elements for connecting it to one or more other constructional element and which may be used to create physical objects and which may be digitally represented on a computer. Examples of construction elements include elements of a construction toy set, e.g. building blocks such as bricks, etc. The term construction element further comprises aggregates of interconnected smaller construction elements, e.g. two or more connected bricks.

In one embodiment, the connection types are grouped into a number of connection groups, e.g. connectors, receptors, and mixed elements. Connectors are connection elements which may be received by a receptor of another construction element, thereby providing a connection between the construction elements. For example, a connector may fit between parts of another element, into a hole, or the like. Receptors are connection elements which can receive a connector of another construction elements. Mixed elements are parts that can function both as a receptor and a connector, typically depending on the type of the cooperating connection element of the other construction element.

It is yet a further advantage of the invention that it provides a method for modeling connections along different surfaces or planes which may be rotated against each other.

It is yet a further advantage of the invention that it provides a compact representation of a model of a geometrical object that allows for modeling of complex objects comprising movable parts and/or parts that can rotate.

It is yet a further advantage of the invention that it provides a compact representation of a model of a geometrical object.

It is yet a further advantage of the invention that it provides a model structure and a representation of the model structure that it is possible to generate and interpret very fast.

It is yet a further advantage of the invention that it provides a representation of a model structure that is expedient for being distributed via a computer network, in the sense of relatively low bandwidth requirement and low processing time when the model is subjected to visualization, is generated, or manipulated.

In a preferred embodiment of the invention, the method further comprises providing a connection table including connectivity information of pairs of the connection types; and the step of retrieving connectivity information comprises retrieving the connectivity information from the connection table.

The term connection table is intended to comprise any suitable data structure for storing connectivity information for pairs of connection types. For example, such a data structure may be a look-up table indexed by pairs of connection types.

By providing a connection table, an efficient and extendable data structure is provided for storing connectivity information relating pairs of connection types. Furthermore, a fast connectivity detection is made possible.

In another preferred embodiment of the invention, each of the respective data structures further represents a number of grids relative to the corresponding construction element, each grid having a number of grid points; and each of the connection elements of the construction element is associated with one of the grid points and has a corresponding connection type.

Hence, by providing grid structures, such as square grids, triangular grids, or the like, with grid points having associated connection types, the different properties of the various connection elements, such as size, shape, connection properties, etc., may be reduced to one or more attributes associated with each of the grid points. Consequently, an efficient representation of the connection properties of a construction element is achieved.

It is a further advantage that by associating the connection elements to grid points a particularly simple detection is possible whether two connection elements are in a predetermined proximity of each other. For example, in one embodiment, where the construction elements are placed in a common discrete volume reference grid and all coordinates are multiples of an arbitrary length unit, an exact match of coordinates may be required for two connection elements to be considered within a predetermined proximity. In a continuous, or quasi-continuous reference coordinate system, it may be required that the grid points coincide within predetermined limits, i.e. that they are placed in a predetermined neighbourhood form each other. The size of the neighbourhood may depend on the types of physical connection elements to be modeled, e.g. how they actually cooperate in order to connect, and on the accuracy of placing construction elements that should be enforced.

It is preferred that each plane along which a construction element may be connected to another construction element is divided into grid segments, e.g. squares where each of the grid segments has a grid point in the centre.

It is preferred that each connection element has an associated direction, indicating in which direction the connection element may engage with a corresponding connection element.

It is further preferred that all connection elements located on a common plane and having a common direction correspond to segments of an orthogonal grid with predetermined distance between neighbouring grid points. Preferably, the connection elements of all construction elements of a set of construction elements are placed on the construction elements according to predetermined rules, allowing to associate each connection element with a corresponding grid point.

It is noted, however, that connection elements on different, non-parallel planes, are not required to have the same distance between the respective grid points. For example, the distance between connection elements on horizontal planes may be different than the distance between connection elements on vertical planes.

Furthermore, by associating connection elements with predetermined grid points the determination whether a connection element of a first construction element is in a predetermined neighbourhood of a connection element of a second construction element may be performed in an efficient way, as the determination may be limited to identifying neighbouring grid points.

In another preferred embodiment, the method further comprises providing a combination table including a resulting connection type for each of a predetermined set of pairs of connection types;

determining a first and second connection element that are positioned in a predetermined geometric relationship to each other;

retrieving a resulting connection type of the first and second connection elements from the combination table; and assigning the retrieved resulting connection type to at least a resulting connection element.

Hence, it is an advantage that the connection types of the connection elements are dynamic, i.e. they may be changed depending on the geometric context a construction element is placed in, thereby providing a more realistic modeling of the connection properties of physical construction elements. In particular, a first connection element of a first construction element and a second connection element of a second construction element may, when positioned in a predetermined geometric relation to each other, cooperatively provide different connection properties than the individual connection elements.

The cooperative effect of the first and second connection elements will often depend on their mutual geometric relation, i.e. on the way the connection elements are placed with respect to each other, e.g. how close they are placed to each other, in which relative orientation they are placed to each other, and/or the like. In one embodiment, this is modeled by determining whether the first and second connection elements are positioned within a predetermined proximity from each other; and, if they are placed in such proximity from each other, assigning the determined resulting connection type to the first and second connection element.

In the data structure this is represented by assigning a resulting connection type to at least a resulting connection element. In one embodiment the resulting connection element is one of the first and second connection elements. In a further preferred embodiment, the resulting connection type is assigned to both the first and the second connection elements.

It is further preferred that the first and second connection elements have re-assigned their respective original connection types, if the corresponding construction elements are re-positioned such that the connection elements are no longer positioned in the required geometric relation.

In an alternative embodiment, the resulting connection element may be a new connection element, e.g. defined such that it has a position related to the positions of the first and second connection elements.

It is understood that, in some embodiments, more than two connection elements may be combined yielding a resulting connection type.

The term combination table is intended to comprise any suitable data structure for storing resulting connection types for pairs of connection types. For example, such a data structure may be a look-up table indexed by pairs of connection types, where each entry of the look-up table comprises a resulting connection type resulting from the combination of a pair of connection elements, each connection element having a respective one of the corresponding pair of connection types.

By providing a combination table, an efficient and extendable data structure is provided for storing information about how the connection types of connection elements may change due to their combination with other connection types.

In particular, in the case of virtual building blocks, a situation that frequently arises is a constellation where two building blocks are placed next to each other, i.e. in an edge-to-edge extension, such that the connection elements on the edges of the neighbouring building blocks change properties.

In a further preferred embodiment, this situation is efficiently modelled when each of the grids associated with the construction elements has at least one grid edge and the method further comprises providing a combination table including a resulting connection type for each pair of connection types;

detecting if a first grid of the first construction element is placed in an edge to edge extension of a second grid of the second construction element, a first edge of the first grid being aligned with a second edge of the second grid;

for a first connection element of the first grid identifying a corresponding second connection element of the second grid;

retrieving a resulting connection type of a combination of the first and second connection elements from the combination table; and assigning the retrieved resulting connection type to the first and second connection elements.

When construction elements are placed next to each other with respective ones of their edges in close vicinity to or even touching each other, the connection elements on the corresponding edges may change their properties depending on the type of connection element on or close to the corresponding edge of the other construction element.

By providing a combination table including a resulting connection type for each pair of connection types; and by assigning the resulting connection types to the connection elements on the edges of the construction elements, if an edge-to-edge extension is detected, even complex connection properties of cooperating construction elements may be modeled.

The term edge-to-edge extension comprises the placement of two grids placed next to each other such that there corresponding grids combine to a combined grid. Hence, the term edge-to-edge extension comprises two parallel grids having respective parallel grid edges and a predetermined overlap along the parallel grid edges, such that the grid points close to the edge coincide.

In another preferred embodiment of the invention, each of the respective data structures further represents a bounding volume of the corresponding construction element; and each of the grids corresponds to a surface of the bounding volume.

Hence, by providing bounding volumes for the construction elements where the grids correspond to surfaces of the bounding volumes, each construction element may be represented by a small number of grids, even if the construction element has a complex shape. Hence, an efficient detection of co-operating connection elements of two construction elements may be achieved, as the complexity of the shape of the construction elements is translated into the connection types which, in turn, are associated as attributes to the grid points related to the surfaces of the bounding volumes.

Furthermore, the bounding volumes provide an efficient representation for detecting neighbouring construction elements by employing known collision detection algorithms.

The bounding volumes may be bounding boxes having mutually orthogonal sides, or bounding volumes having different shapes.

In a further preferred embodiment, the method further comprises encoding respective positions of the first and second construction element with respect to a common volume reference grid, the first and second grid of the corresponding first and second construction elements corresponding to respective first and second planes of the volume reference grid; the grid points of the first and second grids corresponding to respective reference grid points of the volume reference grid; and detecting whether the first and second grids correspond to a common plane of the volume reference grid and whether at least a first grid point of the first grid is located in the same reference grid point as a second grid point of the second grid.

Hence, by providing a volume reference grid, e.g. a cubic volume grid, and defining the surface grids as planes of the reference volume grid, a particularly simple data structure is provided allowing for a particularly efficient detection of neighbouring grid points.

Preferably, the bounding volumes are defined as planes with respect to the volume reference grid. In one embodiment they may coincide with the grid planes of the volume reference grid or, alternatively, may be defined as planes between the grid planes of the volume reference grid.

In a yet further preferred embodiment of the invention, the method further comprises
- identifying all pairs of coinciding grid points of the first grid and the second grid;
- for each of the identified pairs of grid points retrieving connectivity information form the connectivity table;
- refusing connection between the first and second construction elements, if at least one pair of grid points corresponds to an invalid connection; otherwise accepting connection between the first and second construction elements, if at least one pair of grid points corresponds to a valid connection.

Hence, an efficient method for detecting whether two neighbouring construction elements can be interconnected is provided. The term coinciding grid points comprises grid points having the same coordinates. In one embodiment, where the construction elements are placed in a discrete reference grid and all coordinates are multiples of an arbitrary length unit, an exact match of coordinates may be required, i.e. the grid points are located in a common reference grid point. In a continuous, or quasi-continuous reference coordinate system, it may be required that the grid points coincide within predetermined limits.

When each of the connection elements further has an associated direction, a further attribute is associated with each grid point, thereby providing a further degree of freedom.

The term connectivity information is intended to comprise information about the connection properties of a pair of connection types, e.g. for a given pair of connection types whether or not two connection elements of these connection types provide a connection, whether they make a connection impossible and/or the like. In a preferred embodiment, the connectivity information comprises an indicator for each pair of connection types indicating one of a predetermined group of connectivity types, the group consisting of a valid connection which provides a connection between a corresponding pair of connection elements, an invalid connection which prevents a connection between a corresponding pair of connection elements, and an indifferent connection.

The term indifferent connection comprises a pair of connection types which, when placed within a predetermined neighbourhood from each other, do not cooperate to connect the two corresponding construction elements, but which do not prevent such a placement either.

Hence, an efficient coding of the possible interconnections is provided.

In yet another preferred embodiment of the invention, the step of determining a first connection element of the first construction element and a second connection element of the second construction element located in a predetermined proximity of each other further comprises determining the first and second connection elements from a predetermined subset of connection elements. Hence only a subset of connection elements needs to be searched in order to determine a relevant pair of connection elements, thereby increasing the efficiency of the method.

In a further preferred embodiment, each of the respective data structures further represents a bounding volume of the corresponding construction element; the method further comprises detecting an intersection of the bounding volumes of the first and second construction elements; and the step of determining the first and second connection elements from a predetermined subset of connection elements comprises determining the first and second connection elements from connection elements comprised in the determined intersection. Hence the subset of relevant connection elements is determined as connection elements which potentially may provide a connection, since they are comprised in the intersection of bounding boxes.

It is a further advantage of the invention that it provides data structures and algorithms which may easily be extended to incorporate new types of construction elements and even new types of connection elements. For example, the connectivity properties of two sets of existing toy construction elements of different types may be combined such that the construction elements of the different toy construction sets may be interconnected with each other.

It is a further advantage of the invention that it provides data structures that do not require large storage capacity, even when generating models comprising a large number of construction elements.

It is a further advantage of the invention that it provides an efficient method of detecting whether two or more construction elements are connected, thereby decreasing the processing time a computer needs for determining whether construction elements are interconnected. This is a particular important feature in interactive computer programs where a user can position construction elements relative two each other, since in this situation a short response time from the placement or removal of a construction element until the determination of the connectivity properties of the model is required.

The present invention can be implemented in different ways including the method described above and in the following, a system, and further product means, each yielding one or more of the benefits and advantages described in connection with the first-mentioned method, and each having one or more preferred embodiments corresponding to the preferred embodiments described in connection with the first-mentioned method and disclosed in the dependant claims.

The invention further relates to a data processing system comprising
- means for generating a computer readable model of a geometrical object constructed from a plurality of interconnected construction elements, wherein each construction element has a number of connection elements for connecting the construction element with another construction element;
- means for encoding a first and a second one of the plurality of construction elements as corresponding first and second data structures, each representing the connection elements of the corresponding construction element, and each of the connection elements having associated with it one of a plurality of predetermined connection types;
- means for determining a first connection element of the first construction element and a second connection element of the second construction element located in a predetermined proximity of each other; and means for retrieving connectivity information of the corresponding connection types of the first and second connection element indicative of whether the first and second connection elements provide a connection between the first and the second construction element.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to a data processing system adapted to perform the method described above and in the following.

The invention further relates to a computer program comprising program code means for performing all the steps of the method described above and in the following when said program is run on a computer.

The invention further relates to a computer program product comprising program code means stored on a computer readable medium for performing the method described above and in the following when said computer program product is run on a computer.

The invention will be explained more fully below in connection with a preferred embodiment and with reference to the drawing, in which:

BRIEF DESCRIPTION OF THE FIGURES

FIGS. 5a-b illustrate data structure each representing the connection points of a surface of a construction element.

DETAILED DESCRIPTION OF PREFERRED EMBODIMENTS

FIGS. 1a-e show perspective views of a representation of a construction element according to an embodiment of the invention.

Figure 1A:
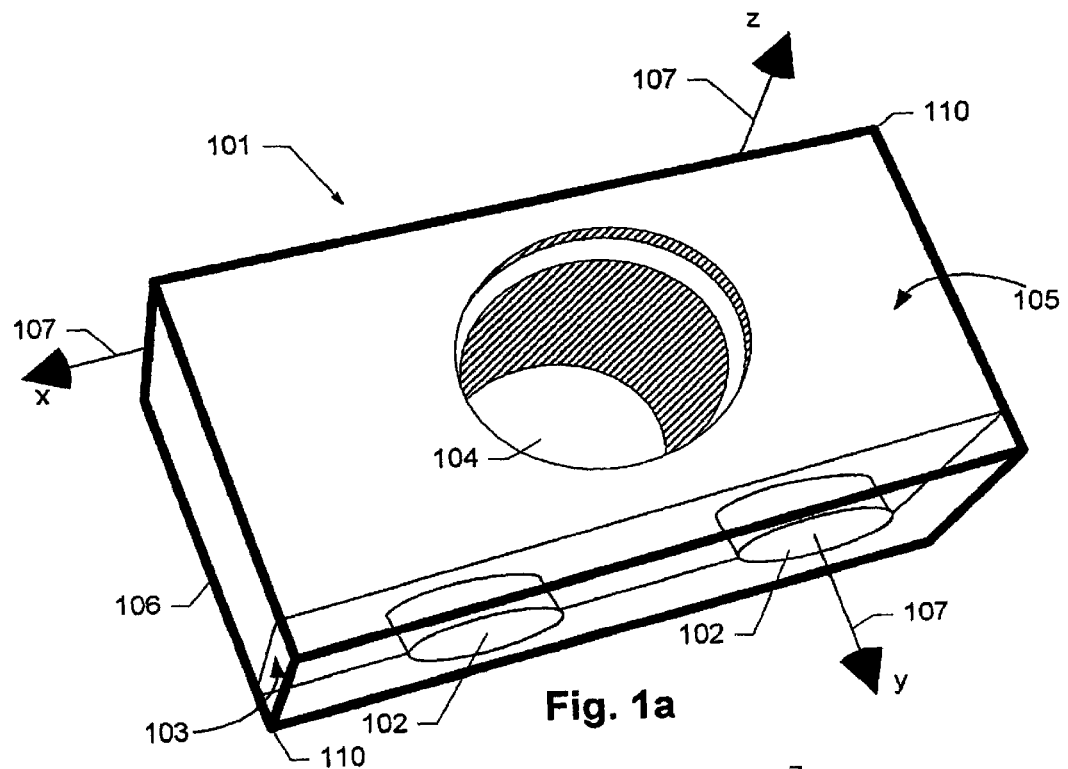
FIGS. 1a-e show perspective views of a representation of a construction element according to an embodiment of the invention.

FIG. 1a shows a representation of a construction element 101. The construction element 101 is a digital representation of a physical building block having on one of its faces, designated 103, two knobs 102 which can connect to corresponding holes of another building block. The building block further comprises a hole 104 penetrating the building block from face 105 to the opposite face of the building block. The hole is adapted to receive corresponding connectors of other building blocks.

The digital representation of the building block 101 comprises a bounding volume 106 represented by thick lines in FIG. 1a. The bounding volume 106 is a bounding volume of the building block 101 including the knobs 102. The digital representation further of the building block is described with respect to an internal right-handed coordinate system 107. It is understood that the choice of coordinate system, in particular the location of its origin and the directions of the axes, may be selected according to any suitable convention. Hence, in a corresponding data structure the position and orientation of the building block may be represented by the coordinates of the origin and the direction of the axes of the coordinate system 107 with respect to an external coordinate system, e.g. the coordinate system of another building block or a global "world" coordinate system.

The bounding volume may be represented in a data structure relative to the coordinate system 107, e.g. by the coordinates of the two corners 110 with respect to the coordinate system 107.

Figure 1B:
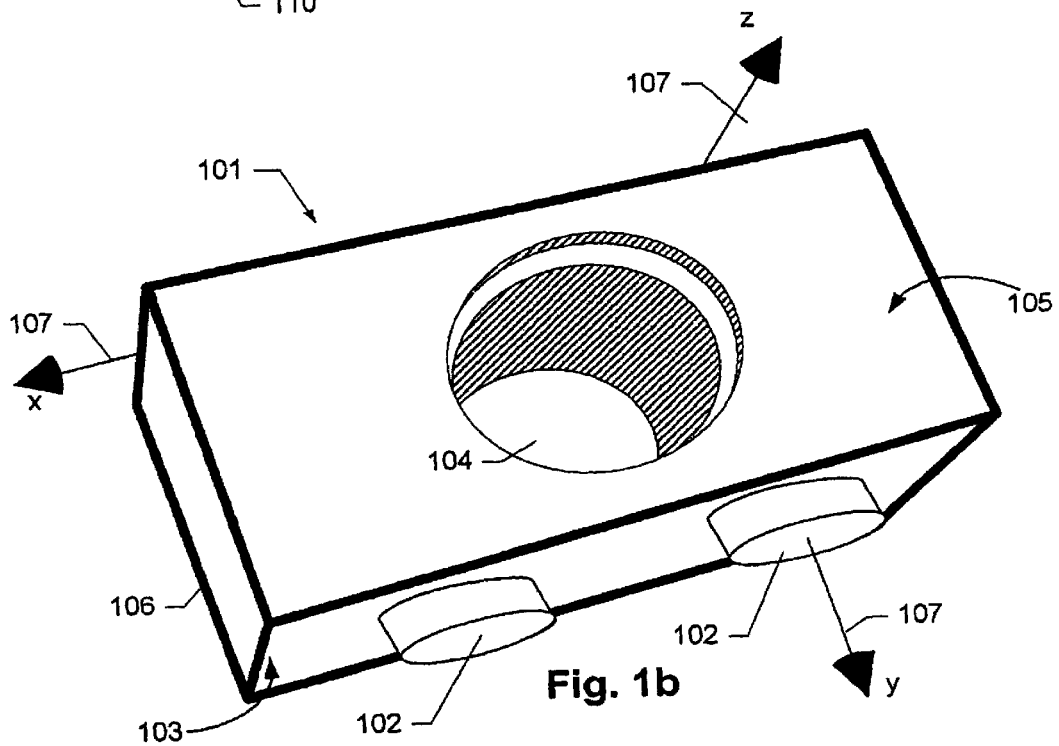

FIG. 1b shows a representation of the building block 101 with a bounding volume 108 that includes the building block but without the knobs 102. In one embodiment, collision detection between different building blocks relies on both types of bounding volumes, i.e. the bounding volume 106 shown in FIG. 1a and the bounding volume 108 of FIG. 1b.

According to the invention, each plane along which the building block may be connected to another building block is divided into squares with a connection point in the centre of each square, i.e. the edges of the squares correspond to half-distances between neighbouring connection points.

Figure 1C:
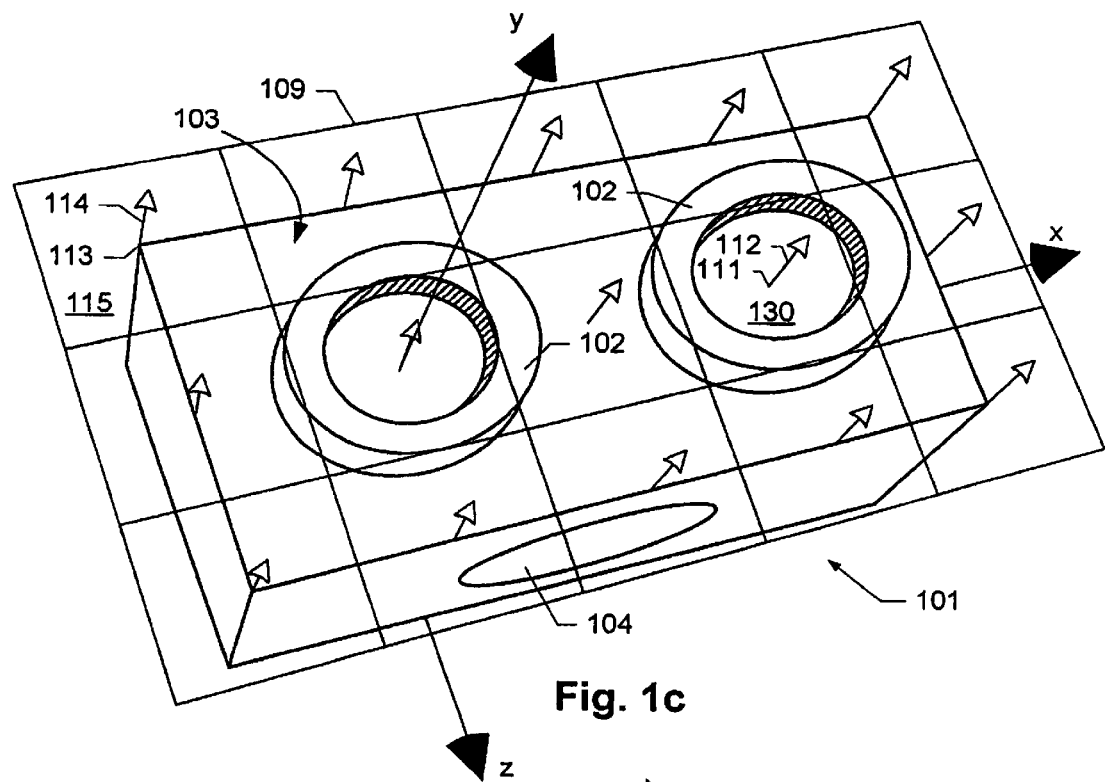

FIG. 1c shows the building block 101 and illustrates the representation of the connection elements on one face of the building block. The representation represents a square grid 109 in the plane of the face 103 of the building block which includes the two knobs 102. The square grid comprises a number of squares, each having a grid point as a centre, as exemplified by square 130 and grid point 111. Each grid point has an associated direction, as indicated by arrows, e.g. arrow 112 of grid point 111. The direction of the grid points of grid 109 is pointing outwards, i.e. in the direction of the y-axis of the coordinate system 107. Hence, in a data structure, a representation of the grid 109 may comprise the coordinates of a predetermined grid point, e.g. the grid point 113, with respect to the coordinate system 107, the direction of the grid points, i.e. the direction of arrow 114 with respect to the coordinate system, the size of the grid, i.e. the number of squares in x-direction and z-direction, respectively, and the attributes related to each of the grid points. An example of such a representation will be described in greater detail below.

Figure 1D:
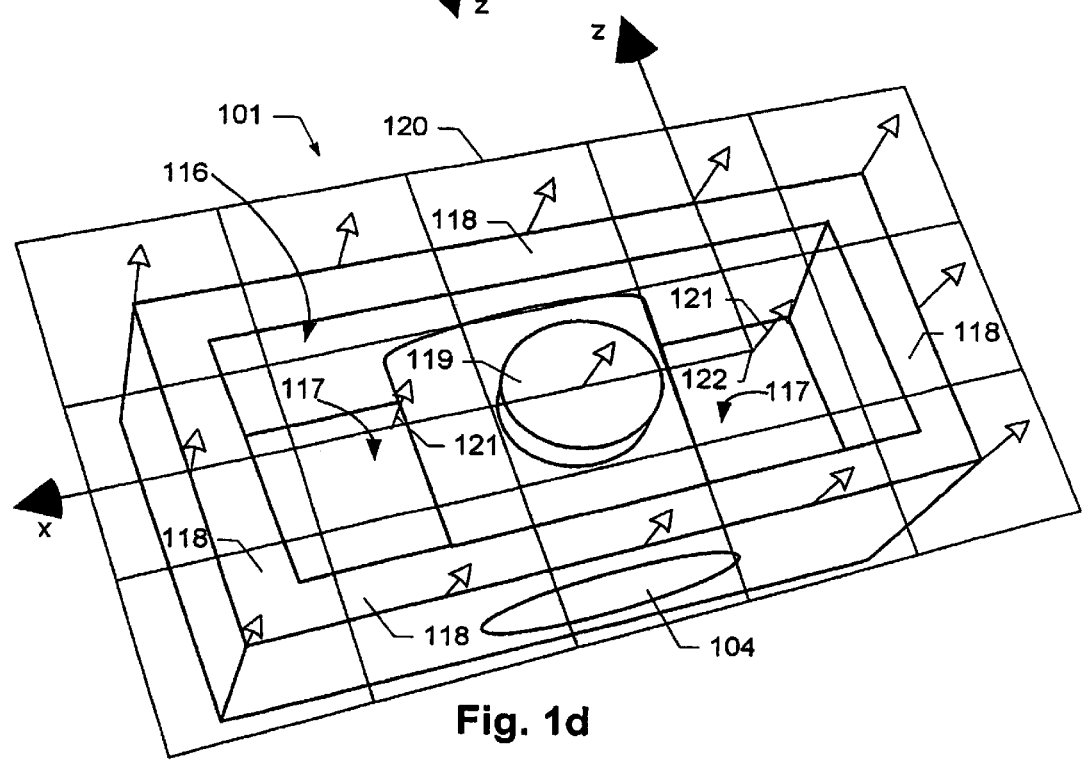

FIG. 1d illustrates the connection grid 120 of the face 116, opposite to face 103 (not shown in FIG. 1d) of the building block 101. This face of the building block comprises two holes 117 defined by the edges 118 and a small centre knob 119, a so-called secondary pin. The holes of the physical building block are arranged to be able to receive knobs, such as the knobs 102, of another building block, thereby cooperatively connecting two building blocks. According to the invention, the holes are represented by the corresponding grid points of the grid 120, as represented by arrows 121.

It is noted that, according to this embodiment, the origin of the coordinate system corresponds to the grid point 122.

Figure 1E:
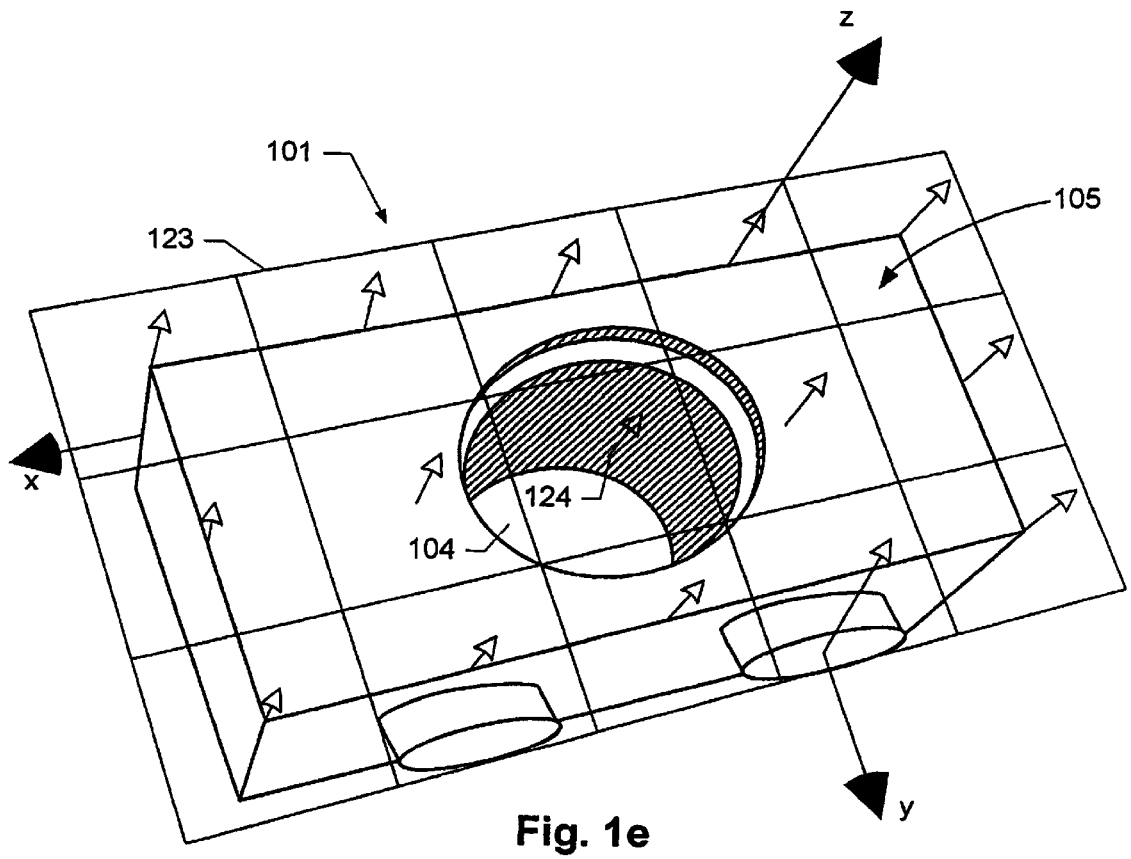

FIG. 1e illustrates the connection grid 123 of the face 105 of the building block 101 which comprises the hole 104. Correspondingly, the grid point 124 represents the connectivity properties of the hole 104.

It is understood that, when graphically representing the building block on a display, e.g. a computer screen, the bounding volumes, coordinate systems, and grids do not need to be shown. Preferably, a graphical representation only includes a rendering of the building block itself.

Figure 2A:
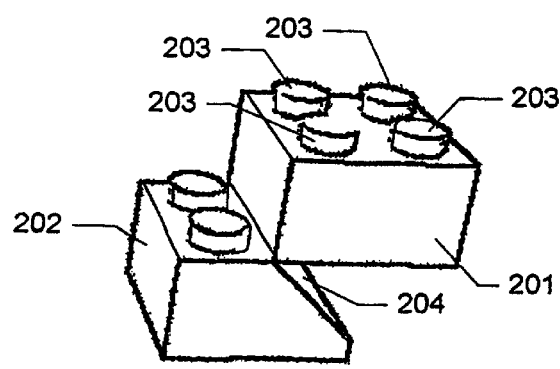
FIGS. 2a-d illustrate examples of construction elements and their connection elements.
Figure 2B:
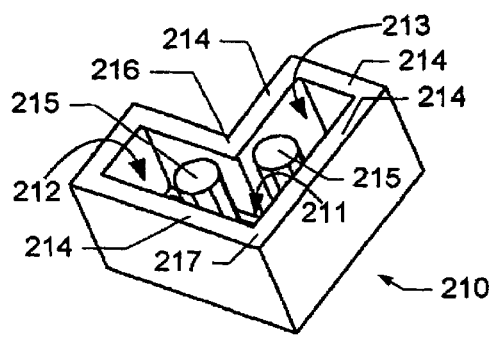
Figure 2C:
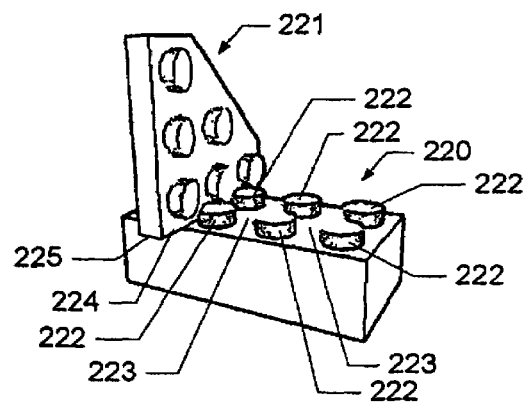

FIGS. 2a-c illustrate examples of construction elements and their connection elements.

FIG. 2a shows two building blocks 201 and 202. Building block 201 is a brick having four knobs 203 on its top face and four corresponding holes on the bottom face (not shown). Brick 202 is an example of a building block with a surface that comprises planes which are not mutually orthogonal. Specifically, building block 202 has a slanted face 204. As is illustrated in FIG. 2a, in their current positions, the building blocks 201 and 202 do not connect.

FIG. 2b shows a building block 210 having a non-rectangular top and bottom face. The bottom face comprises holes 211, 212, and 213 for receiving corresponding knobs of one or more other building blocks. The holes are defined by the edges 214, the secondary pins 215, as well as the corners 216 and 217. Hence, the properties of all of the above elements determine the connectivity properties of this face of the building block.

FIG. 2c illustrates a building block 220 being connected with a building block 221, thereby forming a combined building block. Building block 220 comprises knobs 222 on its top face which are connectors fitting in corresponding holes of another building block. However, as is illustrated by FIG. 2c other connection types may be achieved as well: The gaps 223 between the knobs function as receptors for other connectors, such as the side face 224 of block 221. For the physical building blocks this property is determined by the dimensions of the gaps and the dimensions of the building block 221, i.e. the width 225 of its sides. In the digital representation according to the invention, these properties are represented by corresponding attributes of connection points, as will be illustrated in greater detail below.

Figure 2D:
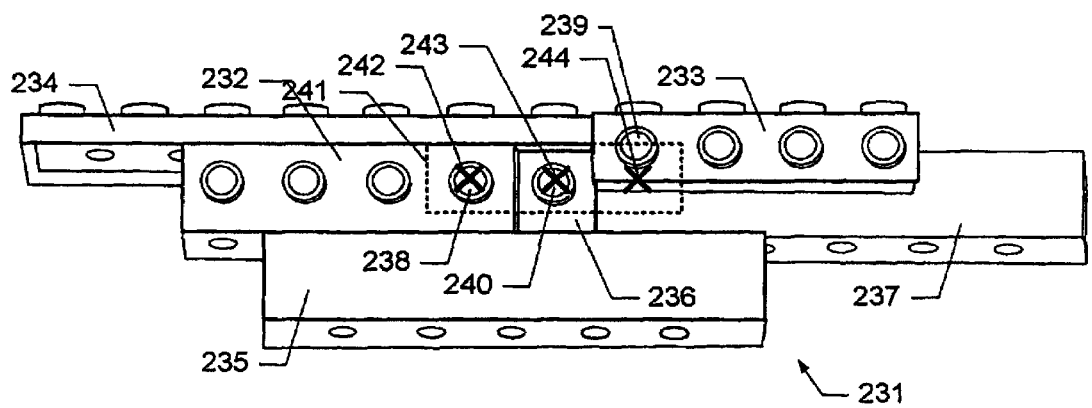

FIG. 2d illustrates an invalid connection of a building block to another building block comprising a number of bricks. The building block 231 comprises bricks 232, 233, 234, 235, 236, and 237. Each building block comprises knob connectors and antiknob receptors as described above. Building blocks 232, 233, and 236 comprise knob connectors on a top side as well as on the side faces: In particular, building block 232 comprises knob 238 on the side face, while building block 233 comprises knob 239 on the side face, and building block 236 comprises knob 240 on its side face.

In the example of FIG. 2d, due to the dimensions of the building blocks, their knobs and, thus, their corresponding connection points do not form a regular grid. Consequently, if a building block is attempted to be placed in the position indicated by the dashed line 241 with its connection points as indicated by crosses 242, 243, and 244, a valid connection is not possible. It will be described below, how the method according to the invention detects this type of situation.

Figure 3:
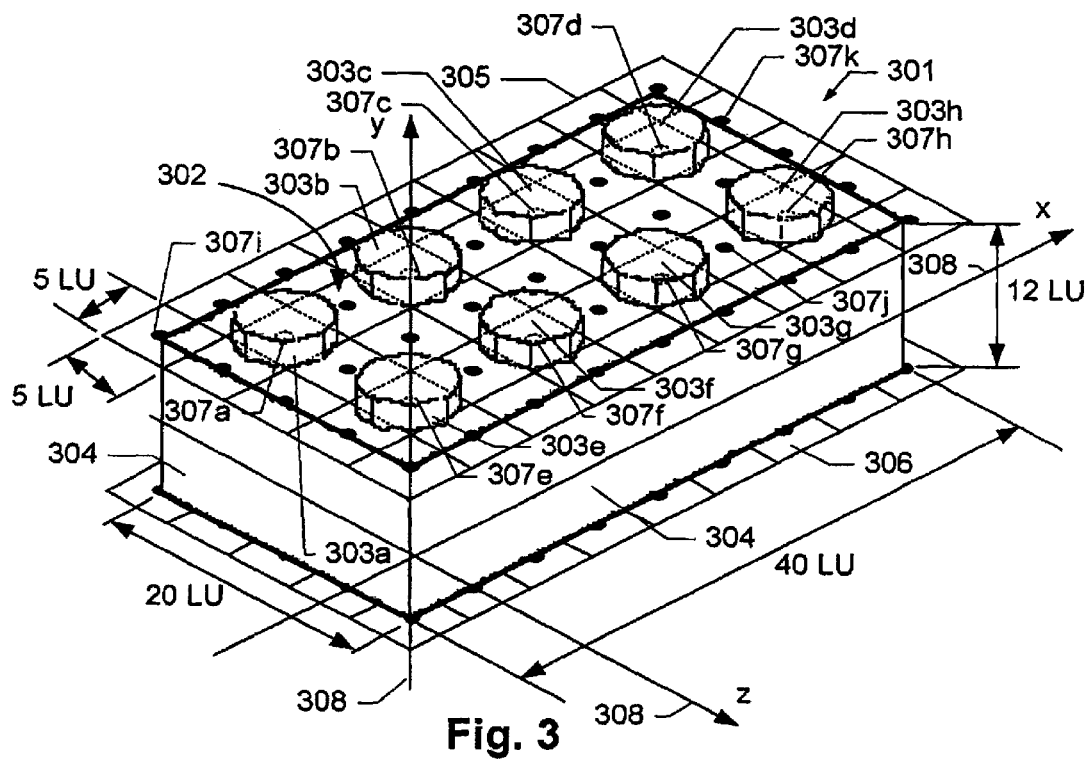
FIG. 3 shows a perspective view of a building block and two of its corresponding connectivity grids.

FIG. 3 shows a perspective view of a building block and its corresponding connectivity grids. The building block 301 has a top surface 302 with eight knobs 303a-h, a bottom surface with corresponding holes (not shown) and side faces 304. In FIG. 3 connectivity grids 305 and 306 of the top surface and the bottom surface, respectively, are shown. The connection points are illustrated by circles as exemplified by circles 307a-k. Hence, connection points 307a-h correspond to knobs 303a-h, respectively. As the side surfaces 304 do not have any connection elements, no connection grids need to be defined for them. In an alternative embodiment, connection grids comprising only void receptors may be defined for the side surfaces.

As can be seen from FIG. 3, a representation of the connection elements of the building block by the connection points placed in a regular grid, imposes certain constraints on the physical placement of the connection elements on the physical building blocks.

The grid 305 is located in the plane of the top surface of the building block from which the knobs 303 extend In the example of FIG. 3, the grid points are placed in a square grid where each square has a dimension of 5×5 units of an arbitrary length unit (LU). Hence, in this geometry, the connection elements are also placed on a corresponding square grid, and the distance between connection elements in a plane of the building block is a multiple of 10 LU. In the example of FIG. 3, the upper and lower surfaces of the building block are rectangular and have a dimension of 20 LU×40 LU, and neighbouring connection elements are spaced apart by 10 LU.

In the vertical direction, on the other hand, the connection elements are spaced apart by 12 LU. Hence, the grid dimensions in different dimensions may vary, thereby potentially causing situations as shown in FIG. 2d above.

The location of the connection points is defined with respect to the internal coordinate system 308 of the building block.

Figure 4:
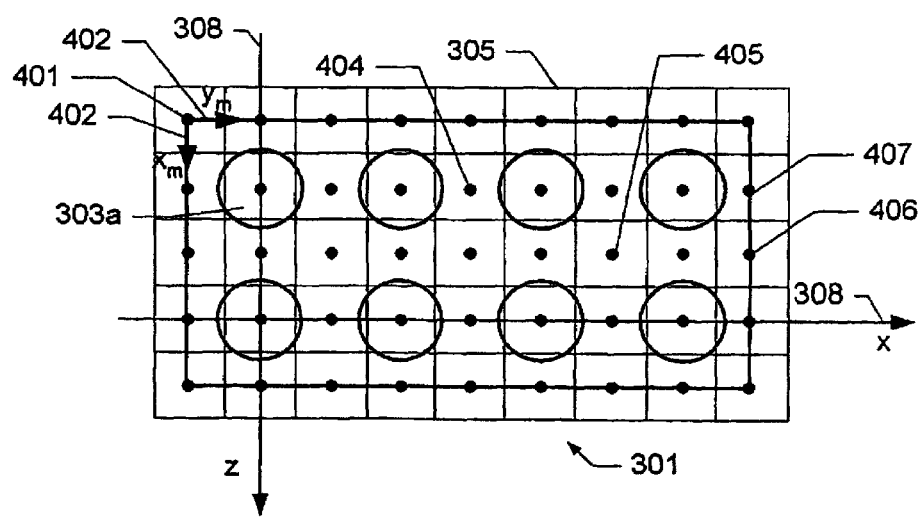
FIG. 4 shows a top view of the building block of FIG. 3.

FIG. 4 shows a top view of the building block of FIG. 3. The connectivity grid 305 is shown including the grid points. The direction of the grid points in the example of FIG. 3 is pointing out of the plane of the drawing.

In one embodiment a data structure representing the grid of connection points comprises, for each connection point: The coordinates of the connection point with respect of the coordinate system 308, the direction of the connection element, and a connectivity type.

When designing a new building block, the digital representation of the building block needs to be generated. The brick in the example of FIG. 4 has 45 connection points on the top surface and 45 connection points on the bottom surface. Specifying the above values for each of the connection points is a time-consuming and error-prone task.

However, for many types of building blocks, the connection points are located in regular structures, thereby allowing and advantageous automated data generation. In the example of FIG. 4, the coordinates of the connection points may be determined iteratively, and the direction of the connection elements is the same for all connection points of a grid.

Hence, in a preferred embodiment, a data structure representing the grid of connection points comprises:

The coordinates of grid point 401 with respect to the coordinate system 308. Hence, in the example of FIG. 4, the coordinates in LUs of the grid point 401 are $P_0=(-5, 12, -15)$.

The direction of the connection elements, i.e. in the example of FIG. 4 (0, 1, 0), i.e. the direction of the y-axis of the coordinate system 308.

The number of grid points in x and z direction, i.e. in the example of FIG. 4, $n_x=9$ and $n_z=5$, respectively.

an array of 5×9 data structures each comprising the connection properties of a corresponding connection point. An example of such an array will be described below.

In the example of FIG. 4, the coordinates of each connectivity point may be expressed as $P_0+(5i, 0, 5j)$, for $i=0, \ldots, 4$, $j=0, \ldots, 8$ (in LUs).

The properties of the connection points may then be represented as a two-dimensional array C indexed by i and j, where C[0,0] corresponds to connection point 401 and C[i,j] corresponds to the connection point with coordinates $P_0+(5i, 0, 5j)$.

In another embodiment, a two dimensional coordinate system in the plane of the connectivity grid may be defined. In FIG. 4, this is illustrated by the coordinate system 402. The two-dimensional coordinate system may then be represented by the coordinates of its origin 401 and a rotation matrix with respect to the internal coordinate system 308 of the building block.

FIGS. 5a-b illustrate examples of data structures representing connection points according to an embodiment of the invention.

FIG. 5a illustrates a data structure representing the connection points of the top grid of the building block of FIG. 4. The data structure corresponds to a two-dimensional array C[i,j] as described above. Each array element corresponds to a connection type. For example, knobs (e.g. knob 303 in FIG. 4) are represented as C[i,j]=K, a gap between two knobs (e.g. gap 404 in FIG. 4) is referred to as and "double edge gap" and represented as C[i,j]=2EG, a gap in the centre of four knobs (e.g. gap 405 in FIG. 4) is referred to as "tube gap" and represented as C[i,j]=TG. Knobs are connectors which may be received by receptors of other building blocks, e.g. by holes 212 illustrated in FIG. 2b. Edge gaps are receptors which may receive edges, e.g. as illustrated in FIG. 2c or edges 211 illustrated in FIG. 2b. Tube gaps are receptors which may receive other connectors, e.g. knobs or tubes of a suitable size.

At the boundaries of the building block other connection types occur: The corners (e.g. corner 401 in FIG. 4) are represented as C[i,j]=¼ TG, as they correspond to a tube gap having only one out of four adjacent. Similarly, C[i,j]=½ TG represents a tube gap having two out of four knobs around it, e.g. connection point 406 in FIG. 4. Finally, C[i,j]=EG corresponds to an edge gap having only one adjacent knob, e.g. connection point 407 in FIG. 4.

It is understood, that a building block as the one illustrated in FIG. 4 but with a different number of knobs corresponds to a connectivity array similar to the one shown in FIG. 5a. Hence, data structures representing this type of building blocks may be generated automatically, by specifying the dimensions of the building block.

It is understood that, in general, for construction elements having regular geometries, a number of different types of connectivity arrays may be defined, e.g. array types for top, side and bottom surfaces of regular building blocks as the building block of FIG. 3. Instances of these array types may then be automatically generated for a variety of different types and sizes of similar construction elements. Hence, it is an advantage that the data structures representing a large variety of building blocks may be generated in an efficient manner.

FIG. 5b shows the connectivity array corresponding to the bottom face of the building block shown in FIG. 2b. Here C[i,j]=EC corresponds to an edge corner, e.g. the corner 217 in FIG. 2b corresponds to C[0,0]=EC. Furthermore, C[i,j]=E corresponds to an "edge", such as the edges 214 in FIG. 2b. C[i,j]=¾ EC corresponds to a corner as illustrated by corner 216 in FIG. 2b. C[i,j]=AK corresponds to an "antiknob", i.e. a hole 212 for receiving a knob, while C[i,j]=SP corresponds to a "secondary pin" 215.

It is understood that, even though the connection types in FIGS. 5a-b are represented by mnemonics indicative of the actual physical function of the connection elements, the connection types may be coded by any other suitable means, e.g. by enumerating connection types, bit coding, or the like.

In general, a connection type may comprise a connection category and a parameter. For example, the connection category tube gap αTG with α=¼, ½, ¾, 1.

The connection properties of the different connection types are defined in a corresponding connection table. The connection table indicates, for each pair of connection type, the connectivity properties. Preferably, the connection table is stored as a lookup table in a suitable data structure. An embodiment of such a connection table is illustrated in table 1.

TABLE 1

|     | K | SP | E | αEC | VC | αAK | αTG | αEG | VR | Tu |
|-----|---|----|----|----|----|----|----|----|----|----|
| K   | F |    |   |     |    |     |     |     |    |    |
| SP  | F | V  |   |     |    |     |     |     |    |    |
| E   | F | V  | V |     |    |     |     |     |    |    |
| αEC | F | V  | V | V   |    |     |     |     |    |    |
| VC  | F | V  | V | V   | V  |     |     |     |    |    |
| αAK | T | V  | V | V   | V  | V   |     |     |    |    |
| αTG | F | V  | V | V   | V  | V   | V   |     |    |    |
| αEG | F | V  | V, if α = 2 | F | V | V | V | V |  |  |
|     |   |    | T, if α = 1 |   |   |   |   |   |    |    |
| VR  | V | V  | V | V   | V  | V   | V   | V   | V  |    |
| Tu  | T | V  | V | V   | V  | V   | T   | F   | V  | V  |

Hence, each field in table 1 indicates the connectivity of the corresponding two connection types.

The abbreviated connection types of table 1 are:

K: Knob, e.g. knob 102 in figs 1a-e, i.e. a circular element.

SP: Secondary pin, e.g. secondary pin 215 in FIG. 2b, i.e. a small knob.

E: Edge, e.g. edge 214 in FIG. 2b, i.e. an outer edge of an element.

αEC: Edge corner with parameter α. ¾ EC corresponds to a corner as illustrated by corner 216 in FIG. 2b.

VC: Void connector, i.e. a part of a building block that does not repel most other elements, nor does it connect with another element, e.g. a smooth surface. Void connectors repel knobs, but do not interact with any other receptors or connectors.

αAK: Antiknob with parameter α, e.g. antiknob 215 in FIG. 2b, i.e. an irregularly shaped hole into which a knob fits.

αTG: Tube gap with parameter α. For example, FIG. 4 shows tube gap 405 with α=1, i.e. an area between four adjacent knobs, into which a tube can fit.

αEG: Edge gap with parameter a, for example double edge gap with α=2 and edge gap 407 with α=1, i.e. a gap between two adjacent knobs or between a knob and an edge.

VR: Void receptor, i.e. a part of a building block that does neither repel nor connect to any other element.
Tu: Tube, a circular tube which can be a receptor for a knob and which can be a connector which can be wedged between four adjacent knobs, i.e. into a tube gap.

In table 1, the connectivities of the above connection types are indicated as follows:

T: true, i.e. a connection is valid, and the corresponding connection elements engage to connect the two building blocks.
F: false, i.e. a connection is not allowed in this position.
V: void or indifferent, i.e. there is nothing that prevents a connection, but nothing that actually connects either.

For example, according to table 1, a double edge gap (αEG with α=2) yields a void connection with an edge (E), while an edge gap, i.e. αEG with α=1 actually connects with an edge (E), i.e. the connectivity in this case is true (T).

It is noted that the connection table of table 1 is symmetrical along the diagonal.

It is further noted that the above table may easily be extended to comprise a new connection type by adding a corresponding row and column with the corresponding connectivities of the new connection type with the respective existing connection types.

Figure 6:
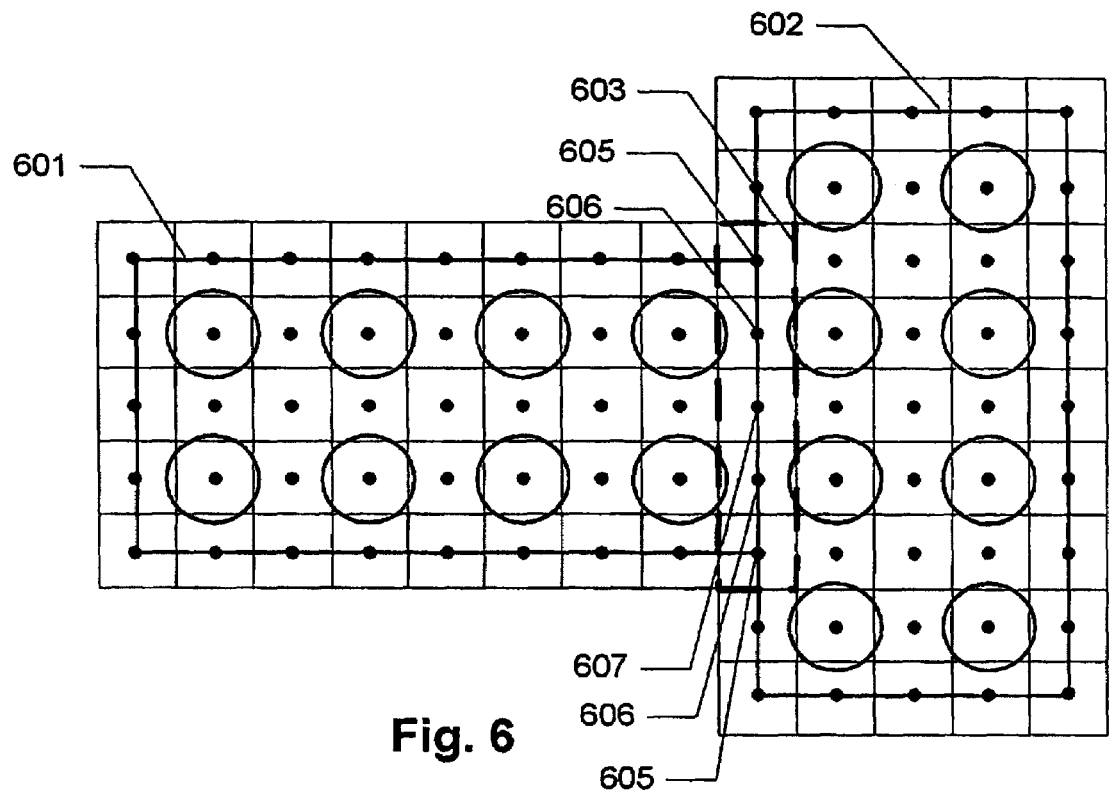
FIG. 6 shows a top view of two construction elements in an edge-to-edge extension.

FIG. 6 shows atop view of two construction elements in an edge-to-edge extension. In the example of FIG. 6, two building blocks 601 and 602 are placed in an edge-to-edge extension, i.e. their top surfaces are placed in the same plane and a subset of their respective connection points coincide as indicated by the dashed line 603. In the example of FIG. 6, it is assumed that each of the building blocks 601 and 602 are of the type shown in FIGS. 3 and 4.

By placing the two building blocks in an edge-to-edge extension, the effective connection type of the overlapping connection points in the area 603 are changed. For example, connection point 605 corresponds to a connection point of type ¼TG of building block 601 and of type ½TG of building block 602. However, when placed in the edge-to-edge extension of FIG. 6, the combined connection point 605 is of type ¾TG. Similarly, connection point 606 is of type EG of each of the building blocks 601 and 602, while it is of type 2EG in the combined building block. Finally, connection point 607 is of type ½TG of each of the building blocks 601 and 602, while it is of type TG in the combined building block.

Hence, in general the connectivity properties of connection elements may change dependant on the placement of the corresponding construction element in relation to other construction elements.

According to the invention, this situation may be modelled by defining a combination table describing the combined or resulting connection types of overlapping connection points. Table 2 is an example of such a combination table indicating the combinations of the connection types introduced above. Preferably, the combination table is stored as a look-up table in a suitable data structure.

TABLE 2

|  | K | SP | E | αEC | VC | αAK | αTG | αEG | VR | Tu |
|---|---|---|---|---|---|---|---|---|---|---|
| K | F | | | | | | | | | |
| SP | F | F | | | | | | | | |
| E | F | F | 2E | | | | | | | |
| βEC | F | F | (β + 2)EC | (α + β)EC | | | | | | |
| VC | F | F | VC | VC | VC | | | | | |
| βAK | T | F | F | F | F | (α + β)AK | | | | |
| βTG | F | F | F | F | (β + 1)TG | F | (α + β)TG | | | |
| βEG | F | F | F | F | (β + 1)EG | (β + 1)EG | (β + 1)EG | (α + β)EG | | |
| VR | S | SP | E | αEC | VC | αAK | αTG | αEG | VR | |
| Tu | T | F | F | F | F | F | F | F | F | F |

In table 2, each field comprises the combined connection type. If a combination of two connection types does not yield a connection type which connects to any other connection type, the table entry is F.

For example, when, an edge gap (βEG) is placed next to a void connector (VC), e.g. an empty surface, the resulting connection element may be thought of as being a wider gap. In table 2, this is approximated by (β+1)EG.

It is further understood that the above combination table can also be used to determine a resulting connection type in situations where more than two connection elements are to be combined, e.g. the corners of three or four building blocks. In this situation, a resulting connection type for e.g. three connection elements may be determined by first determining the first resulting connection type for two of the combined connection elements, and subsequently determining a second resulting connection type of the combination of the first resulting connection type and the connection type of the third connection element.

It is further noted that the above table may easily be extended to comprise a new connection type by adding a corresponding row and column with the corresponding resulting connection types resulting from a combination of the new connection type with the respective existing connection types.

Hence, in the above, data structures for an efficient and extendable representation of connectivity properties of building blocks is disclosed as well as an efficient and extendable representation of rules about how to combine connection types.

Figure 7:
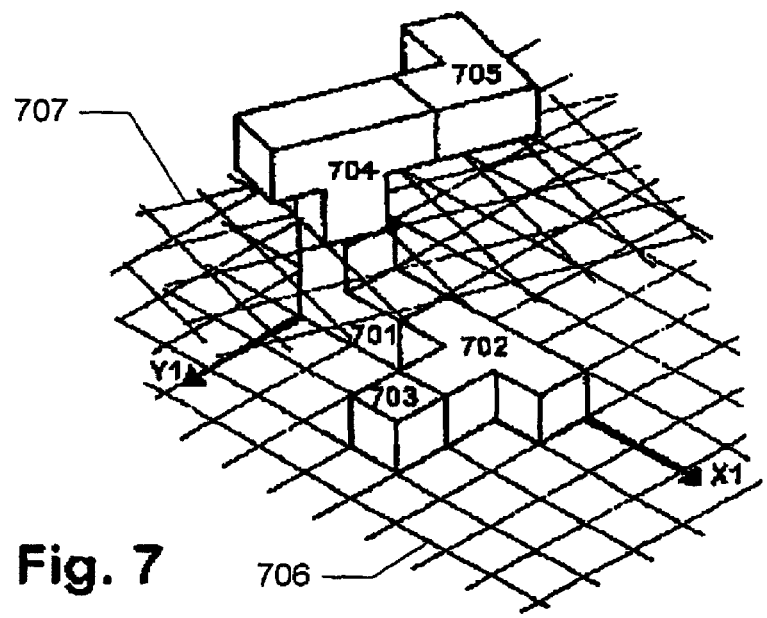
FIG. 7 shows a perspective view of a construction element including two connected groups of construction elements.

FIG. 7 shows a perspective view of a geometrical object including two connected groups of building blocks. The geometrical object comprises five elements 701, 702, 703, 704, and 705. In the example of FIG. 7, the geometrical object comprises two groups of building blocks: A first group of building blocks includes building blocks 701, 702, and 703, while a second group includes building blocks 704 and 705. The building blocks 701 and 704 in this example are rotably connected, e.g. by a single knob-antiknob connection described above, or by any other way of connecting which does not prevent the building blocks from rotating relative to each other, e.g. a hinge connection, two or more knob-antiknob connections on a common line, etc. Hence, the geometrical object of FIG. 7 is an example of building blocks which are not necessarily bound to the position and orientation constraints given within a geometrical object. Other examples of such connections include connections between building blocks that allow for a relative translation of the connected building blocks. Hence, such groups of building blocks may need to be described by separate coordinate systems, as is illustrated by the grid systems 706 and 707.

Figure 8:
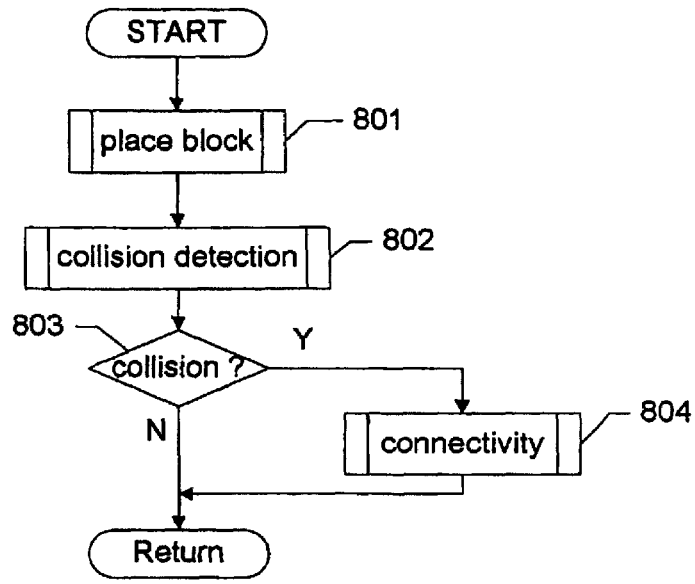
FIG. 8 shows a flow diagram of a method of placing a construction element within a method of generating a computer readable model of a geometrical object.

FIG. 8 shows a flow diagram of a method of placing a construction element as a part of a computer-implemented process of generating a computer readable model of a geometrical object.

In an initial step 801, a construction element is placed in a predetermined initial position. The construction element is represented by a data structure as illustrated above, and the position and orientation of the construction element is described by suitable coordinates describing the position and orientation of the internal coordinate system of the construction element with respect to a suitable coordinate system, e.g. a three dimensional right-handed "world" or reference coordinate system.

Hence, for a given context, e.g. a scene, a geometrical object, or the like, the process generates and maintains a set of data structures, each representing a building block placed within that context. Placing a new construction element within that context corresponds to generating a new instance of a corresponding data structure as a part of that set of data structures.

The placement of the construction element may be caused by a user command, e.g. during an interactive process of constructing a digital model of a geometrical object. For example, a computer may provide a user interface allowing a user to select different construction elements, e.g. construction elements of different types, shape, size, color, etc, and to place a selected construction element in a predetermined position and orientation in a three dimensional graphical scene rendered on the display of the computer. For example, the user interface may provide a drag-and-drop operation for placing the construction element as well as operations for manipulating, e.g. rotating, the construction element.

In one embodiment, the placement of the construction element may be restricted, e.g. to discrete positions on a predetermined grid, e.g. in a system where all distances are measured as multiples of an arbitrary length unit (LU), the grid points of the reference grid may be spaced apart by 1 LU.

In step 802, the computer-implemented process detects where the construction element that was placed in step 801, intersects with any other construction elements already present in the scene, e.g. construction elements previously placed by the user. This collision detection may be performed by any suitable collision detection method, preferably a collision detection method based on a bounding volume of the construction element. Examples of such algorithms are disclosed in e.g. David H. Eberly: "3D Game Engine Design", Morgan Kaufmann, 2001.

The collision detection may result in that the position in which the construction element was placed is already occupied by another construction element. This situation may be detected by detecting an intersection of the bounding volumes which is larger than a predetermined limit. If an invalid intersection is detected, placement of the construction element at this position and orientation may be rejected.

If no invalid intersection is detected, the process tests in step 803 whether the newly placed construction element validly intersects with another construction element. A valid intersection may, for example be detected as an intersection of the respective bounding volumes which is smaller than a predetermined limit.

In the embodiment of FIG. 1, the representation of the construction element comprises two bounding volumes, a bounding volume including the connection elements (FIG. 1a) and a bounding volume including the body of the construction element but not the connection elements (FIG. 1b). The collision detection step may use these two bounding volumes to detect an invalid collision, if the bounding volumes without connection elements of the respective construction elements overlap. A valid overlap is detected, if the bounding volumes including the connection elements overlap but not the bounding volumes without connection elements, or if any of the surfaces of any the bounding volumes intersect but the bounding volumes do not overlap.

Furthermore, it is detected whether the bounding volumes are oriented such that the axes of their bounding volumes correspond to the same reference coordinate system.

If no valid collision is detected the process may proceed according to any suitable strategy. In some embodiments it may be acceptable to place new construction elements in the void without connecting the to any previous construction elements; in some embodiments this may only be acceptable if no other construction elements already exist in the scene. In yet other embodiments this may be rejected. For example, in one embodiment, any initial scene without user-placed construction elements may comprise a default construction element, e.g. a support plate with connection elements for placing construction elements in top of the ground plate.

If a valid collision between the newly placed construction element and one or more other construction elements was detected in step 803, the process continues at step 804 and checks whether the newly placed construction element may be validly connected to the construction element(s) it validly intersects with. A preferred embodiment of this connectivity detection sub-process will be described in greater detail below. The connectivity detection may result in an acceptance of the placement of the construction element, if it validly connects to the construction element(s) it intersects with, or in a rejection if it does not validly connect with any one of the construction elements it intersects with.

Once the placement of the construction element is accepted or rejected, the process may be initiated again by a user action, e.g. by replacing the rejected construction element in an alternative position and/or orientation, by placing another construction element in the scene, or the like.

Figure 9:
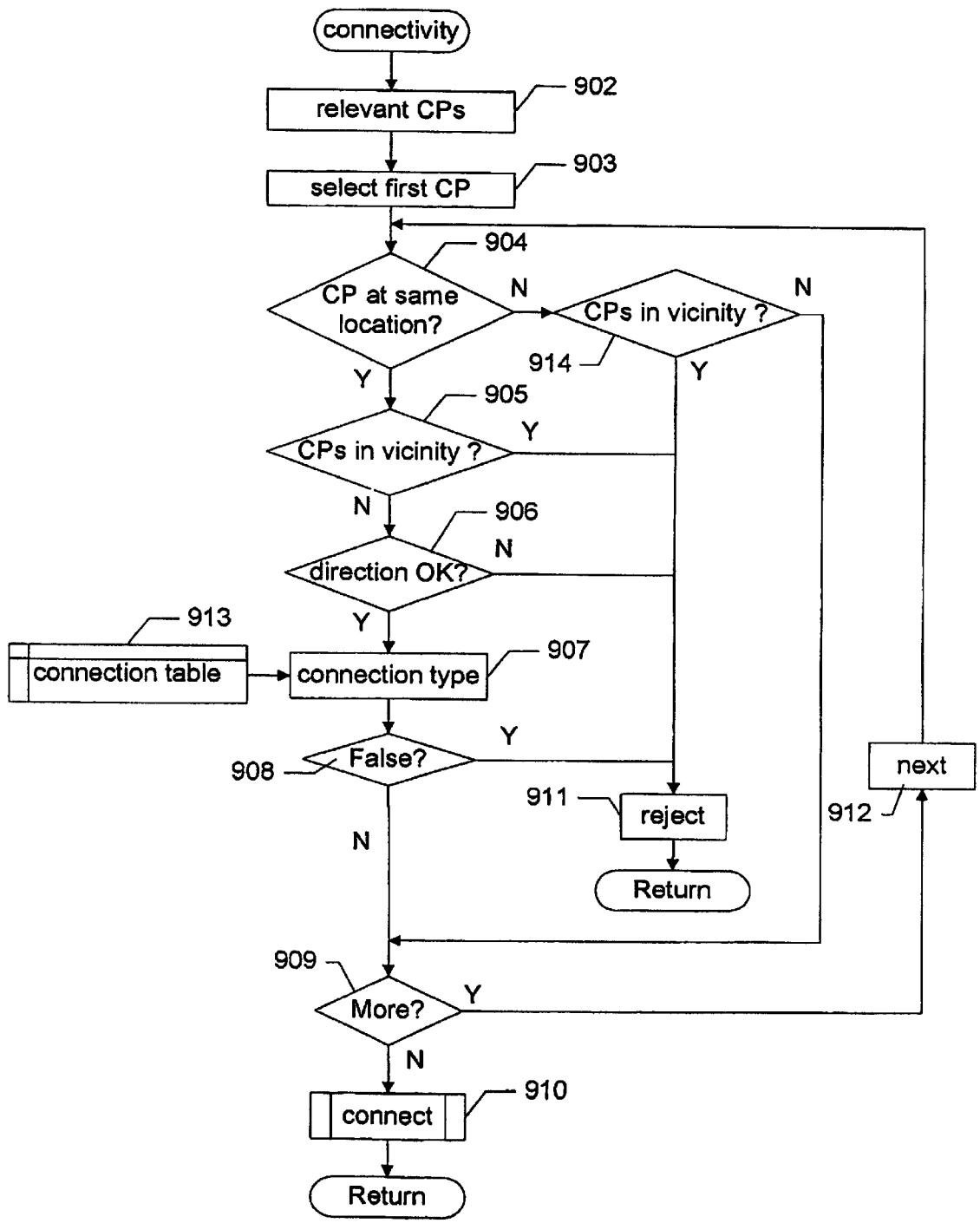
FIG. 9 shows a flow diagram of the process of connecting a digital construction element to another digital construction element according to an embodiment of the invention.

FIG. 9 shows a flow diagram of the sub-process 804 of connecting a first digital construction element to another, second digital construction element according to an embodiment of the invention. For example, the first construction element may be a newly placed brick and the second construction element may be a previously constructed structure of bricks, where a detection algorithm has detected an intersection between the newly placed brick and the second construction element.

In the following, it is assumed that in their initial positions, the construction elements are oriented so that main axes of their bounding volumes correspond to x, y, and z axes of right-handed orthogonal world coordinate system.

In this embodiment it is further assumed that a number of predetermined rules for placements of connection elements on the construction elements are imposed, although connection elements themselves may differ in nature and shape.

The assumptions for the placement of connection elements are:

For each construction element, the axes of all connection elements in the same horizontal plane correspond to segments of an orthogonal grid with fixed distance between neighbouring segments.

Distance between axes of connection elements in horizontal and vertical planes need not be the same.

In the initial step 902, all connection points of the first construction element and of the second construction element that belong to the detected intersection. Only those connection points that are not already connected need to be considered; these connection points will be referred to as the relevant connection points.

In step 903, a first relevant connection point of the first construction element is selected. This may be an arbitrarily selected connection point, a connection point selected by the user, or the like.

In step 904, for the selected connection point of the first construction element the process checks whether there are any relevant connection points of the second construction element having the same coordinates as the selected connection point. In one embodiment, where the construction elements are placed in a discrete volume reference grid and all coordinates are multiples of an arbitrary length unit, an exact match of coordinates may be required. In a continuous, or quasi-continuous reference coordinate system, it may be required that the grid points coincide within predetermined limits.

If no such matching connection point is found, the process continues at step 914.

In step 914, it is detected whether there are any other of the relevant connection points within a predetermined neighbourhood of the selected connection point. In the embodiment of FIG. 9 the predetermined neighbourhood corresponds to a cube (x±5 LU, y±5 LU, z±5 LU) around the selected connection point at (x, y, z), since in this embodiment the distance between two adjacent connection elements is 10 LU. If there are any other of the relevant connection points within a predetermined neighbourhood of the selected connection point, connection of the two construction elements is rejected (step 911) and the algorithm terminates. Hence, as the connection points in this embodiment are placed on a regular grid, an invalid placement of the construction element may efficiently be detected: If a mismatch with a relevant connection point of the second construction element is found for one of the relevant connection points of the first construction element, the remaining connection points of the first construction element do not need to be checked, thereby increasing the speed of the detection process. The above test ensures that a connection as indicated in FIG. 2d is rejected, as the connection point corresponding to knob 239 is misplaced with respect to the regular grid. It is noted that in the example of FIG. 2d, the connection point 243 would not cause a conflict, since, due to the slight difference in height, it does not belong to the intersection of bounding volumes, i.e. there is no contact between brick 241 and 236.

If no conflicting relevant connection point is found in step 914, the process continues at step 909.

If a matching connection point was found in step 904, the process continuous at step 905, where it is detected whether there is any other relevant connection points within a predetermined neighbourhood of the selected connection point, in this embodiment in a cube (x±5 LU, y±5 LU, z±5 LU) around the selected connection point at (x, y, z), as described above. If another connection point is found in the predetermined neighbourhood, the position is rejected (step 911). Otherwise, the process continuous at step 906.

In alternative embodiments, the above restriction may not be desired. Furthermore, in yet another embodiment, the above restriction may be limited to certain connection types, e.g. in the above example all connection types different from "void".

In step 906, the process detects whether the selected connection point and the detected matching connection point have opposite directions, i.e. if their associated directions are along a common line, but in opposite orientation. Hence, only connection elements positioned in a relative orientation suitable for them to engage, are accepted.

It is noted that, in alternative embodiments, this limitation may be relaxed, e.g. by accepting a range of orientations in embodiments where the connection elements accept a range of orientations.

If the relative direction of the connection points are accepted, the process continues at step 907, otherwise, the position is rejected (step 911).

In step 907, the connection types of the selected connection point and the corresponding detected matching connection point are compared by retrieving the connectivity rule of the corresponding pair of connection types from a stored connection table 913, e.g. a connection table according to table 1 above. In this embodiment, the connectivity may be true, false, or void, as described in connection with table 1.

In the subsequent step 908, it is tested whether the connectivity result is "false", i.e. no valid connection is possible between the corresponding connection types. If the connectivity result is "false", the position of the first construction element is rejected (step 911), otherwise the connectivity result is stored and the process proceeds to step 909.

In step 909 it is tested, whether all relevant connection points of the first construction element have been processed. If not, a yet unprocessed relevant connection point is selected (step 912) and processed by performing the above steps 904, 905, 906, 907, and 908 with the now selected connection point.

If all relevant connection points of the first construction element have been processed and the position has not been rejected, the position is accepted and the process continues at step 910. In step 910 it is determined, based on the stored connectivity results, how the construction elements connect, and their respective data structures are updated accordingly. This will be described in greater detail in connection with FIG. 10. Once the data structures are updated, the sub-process terminates and returns to the overall process of FIG. 8.

Figure 10:
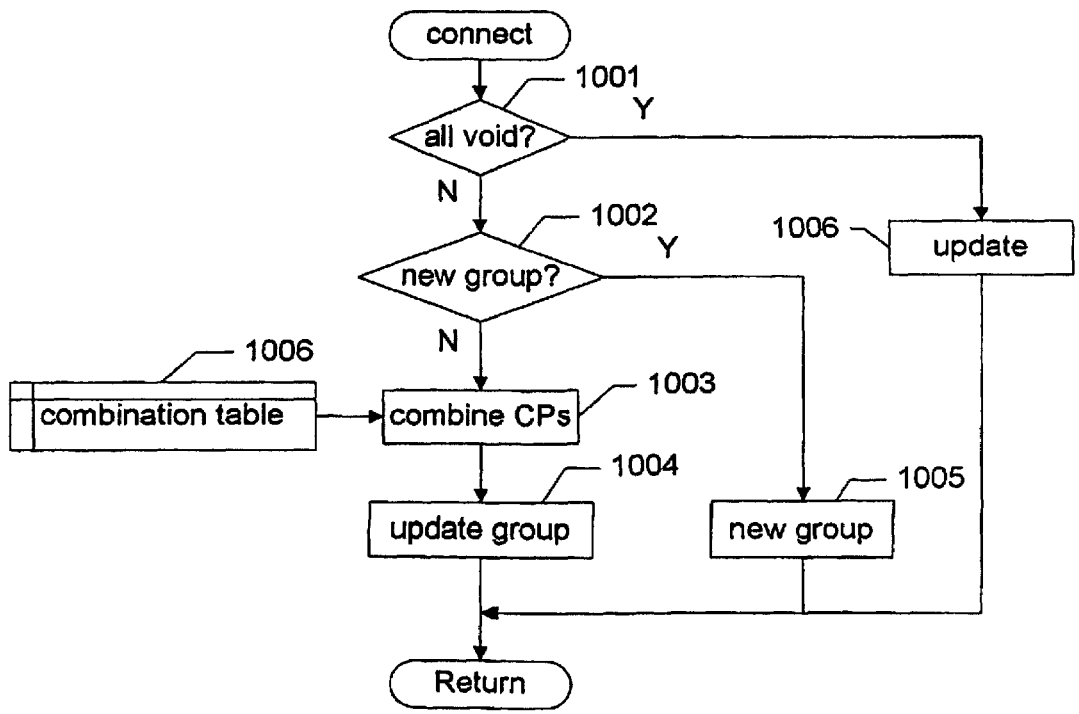
FIG. 10 shows a flow diagram of a sub-process of updating the data structures representing the connected construction element.

FIG. 10 shows a flow diagram of an embodiment of sub-process 910 of updating the data structures representing the connected construction element. The updating is based on the connectivity results determined for all the relevant connection points of the intersection of the bounding volumes of the first and second construction elements.

Initially, in step 1001, it is checked whether all connectivity results are "void". If yes, i.e. if nothing prevents a position of the construction element, but none of the connection elements actually engage to connect the construction elements, the new construction element is allowed in its present position.

Depending on the application, the data structure of the first and second construction elements may be updated. Preferably, since the construction elements are not actually connected, the first construction element should not be combined with the second construction element to a combined construction element having a combined bounding volume, etc.

In one embodiment, an additional algorithm may decide, e.g. based on the bounding volumes, whether a physical building block placed in this position would fall down, tilt, etc. and allow or reject the position accordingly.

Otherwise, i.e. if one or more connectivity results are true, the process proceeds at step 1002, where the process determines, how the construction elements are connected, i.e. whether they are connected rigidly or whether the connection allows for a relative rotation, translation and/or the like.

In the embodiment of FIGS. 1*a-e*, if exactly one connection result is true and all others void, a rotation and/or translation may be possible, depending on the connection types. Furthermore, if more than one connection results are true and the corresponding connection points all lie on a common line, a rotation and/or translation may be possible.

If a non-rigid connection is detected, the process continues at step 1005, where the first and second construction elements are assigned to respective groups, each having their respective reference coordinate system, bounding volumes, etc, thereby allowing to model different relative positions and/or orientations of the groups of construction elements. An example of such a situation was illustrated in connection with FIG. 7 above.

Hence a connected structure of construction elements may be described by a data structure comprising a number of groups of construction elements. A group is a structure in which all construction elements are rigidly connected in a way that all connection points of all construction elements are grid points of the same orthogonal grid. Each group of construction elements includes one or more construction elements where the group determines a common orthogonal coordinate system (grid), a bounding volume, and connectivity grids of the construction elements of that group.

If a rigid connection was detected in step 1002, the process continues at step 1003. As was described in connection with FIG. 6 above, one or more of the connectivity points of the first and second construction elements may change their connectivity type due to the connection. Hence, in step 1003, those connection points of the first and second construction elements are detected which have the same position and the same direction. For those combined connection points a resulting connection type is looked up in a stored combination table 1006, as was described in connection with table 2 above.

Finally, in step 1004, the data structure of the second construction element is updated with the information from the first construction element, i.e. the bounding volume of the second construction element is updated to be a union of the bounding volumes of the first and second construction elements, the connectivity grids are update to also include the connectivity points of the first construction element, etc.

By repeating the process of FIGS. 8, 9, and 10, a plurality of construction elements may be combined to form a digital model of a geometrical object. Hence, in the above, a method for generating a digital model of a geometrical object has been disclosed.

It is understood, that a skilled person may, within the scope of the invention, implement variations of the above method. For example, the order of some of the above steps may be changed, steps may be combined, etc.

Furthermore, the rejection of a position of a new construction element due to an inaccurate placement, e.g. because no connection point at the same position is found or because the connection points do not have exactly opposite directions, may lead to a further processing rather than a simple rejection: In one embodiment hypothetical neighbouring positions or small displacements may be analysed to decide whether an acceptable position may be achieved. This may result in that the construction element snaps, within predetermined limits, into the closest position which provides an acceptable position.

Furthermore, additional restrictions may be imposed or other restrictions may be relaxed in order to provide a modeling system with more or less degrees of freedom and, thus, complexity.

When a construction element is removed from a structure, e.g. in response to a corresponding user command, its data structure is removed from the combined data structure. In one embodiment, this may be implemented by recalculating the combined data structure of the remaining construction elements.

Figure 11:
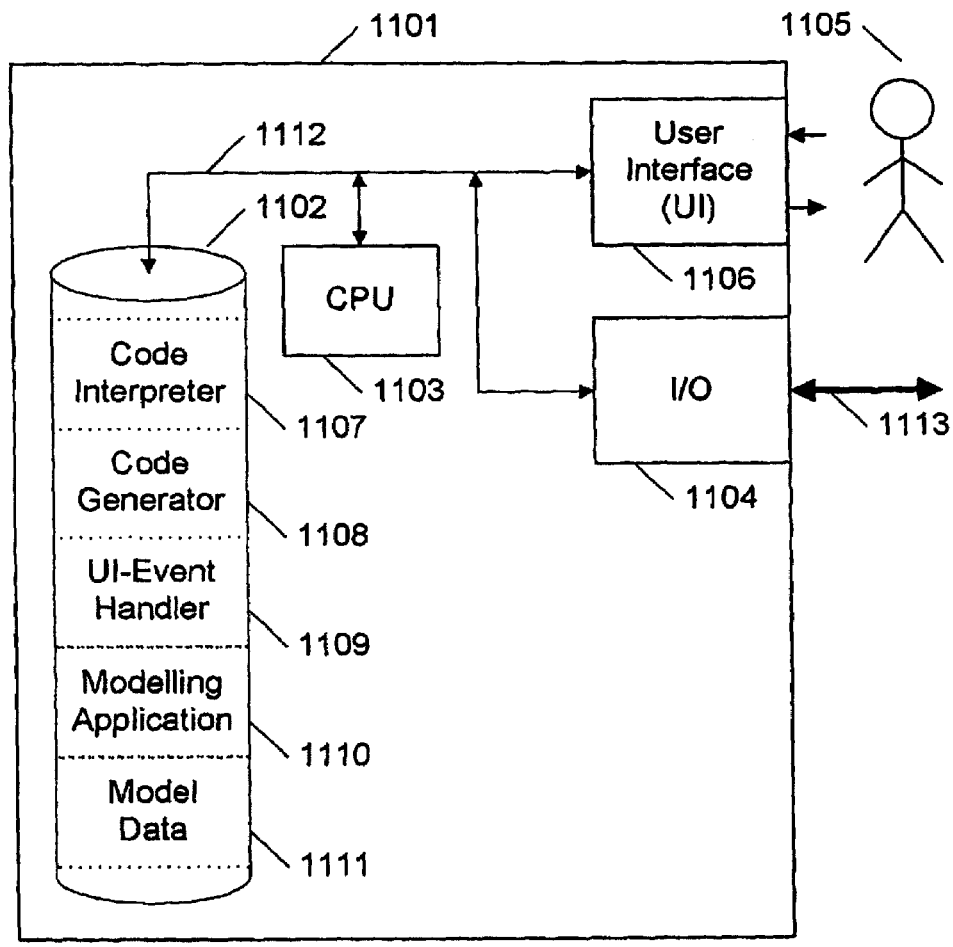
FIG. 11 shows a data processing system for generating computer-readable models of geometrical objects according to an embodiment of the invention.

FIG. 11 shows a data processing system for generating computer-readable models of geometrical objects according to an embodiment of the invention.

The computer system designated 1101 is adapted to facilitate designing, storing, manipulating, and sharing of geometrical constructions according to the invention. The computer system 1101 can be used as a stand alone system or as a client in a client/server system. The computer comprises memory 1102 partly implemented as a volatile and a non-volatile memory means e.g. a hard-disc and a random access memory (RAM). The memory comprises model code interpreter 1107, model code generator 1108, UI-Event Handler 1109, and Modeling Application 1110 executable by the central processing unit 1103. Further, the memory comprises Model Data 1111.

The Code Interpreter 1107 is adapted to read and interpret code defining a model according to the invention, i.e. code representing the data structures of the construction elements of a model. In a preferred embodiment the Code Interpreter is adapted to read a model according to the invention and to convert such a model into a known graphic format for presentation on a computer display. Based on the data structures described above for representing a model of an object, this conversion can be implemented by a person skilled in the art by applying well-known graphical principles known within the field of graphical computing.

The UI-Event Handler 1109 is adapted to convert a user's interaction with a user interface into proper user commands recognizable by the Code Generator 1108. A set of possible and recognizable commands can comprise: Getting a construction element from a library of elements, placing a construction element to be connected to another construction element, disconnecting a construction element, discarding a construction element, manipulating a construction element, a group of construction elements, etc., e.g. by initiating a rotation, etc. Along with each command there may be associated a set of respective parameters, e.g. coordinates, types of construction elements, etc.

The Code Generator 1108 is adapted to modify the data structures describing an actual model according to the invention as described above and in response to a user's commands. As a concurrent or subsequent task, the Code Interpreter can be executed for presenting the result of the Code Generator.

The Modeling Application 1110 is adapted to control memory, files, the user interface, etc.

A user 1105 is capable of interacting with the computer system 1101 by means of the user interface 1106.

In order to load models, geometrical descriptions, or other data, the computer system comprises an input/output unit (I/O) 1104. The input/output unit can be used as an interface to different types of storage media and different types of computer networks, e.g. the Internet. Further, the input/output unit (I/O) 1104 can be used for exchanging models with other users e.g. interactively.

Data exchange between the memory 1102, the central processing unit (CPU) 1103, the user interface (UI) 1106, and the input/output unit 1104 is accomplished by means of the data bus 1112.

Figure 12A:
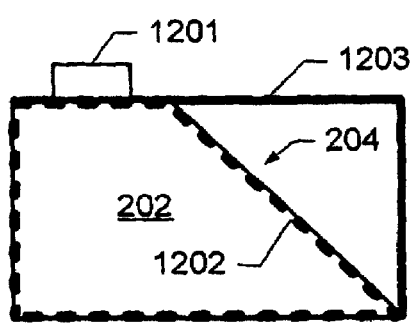
FIGS. 12a-b show a side view of a building block with a slanted surface and examples of the corresponding bounding volumes.

FIG. 12*a* shows a side view of a building block, e.g. building block 202 of FIG. 2*a*, with a slanted surface and corresponding bounding volumes according to a first embodiment of the invention. The building block 202 comprises a slanted surface 204 and knobs 1201 on the top of the building block. According to this example, the representation of the building block 202 comprises a hierarchy of bounding volumes. A first bounding volume 1202 comprises a slanted surface, while a second bounding volume 1203 is a box with sides being orthogonal to each other. According to this example, two building blocks are detected as being in contact, only if the bounding volume 1203 has an intersection with a corresponding bounding volume of another building block. The bounding volume 1202 may be used for an initial efficient detection of possibly connected building blocks. It is understood that the representation of the building block 202 may comprise additional bounding volumes, such as bounding volumes including connection elements as described in connection with FIGS. 1*a-b*.

Figure 12B:
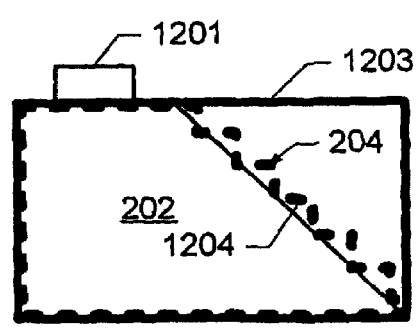

FIG. 12*b* shows a side view of the building block 202 with a slanted surface and the corresponding bounding volumes according to a second embodiment of the invention. As in the example above, the representation of the building block 202 comprises a hierarchy of bounding volumes. However, according to this example, instead of a bounding volume with a slanted surface, the representation comprises a bounding volume 1204 having a step-function like shape, thereby providing an approximation of a slanted surface.

The above method and system may be applied in connection with a computer application for designing physical models, e.g. a computer application which simulates the connectivity behaviour of a corresponding set of physical construction elements. For example a physical toy constructions set may be supplemented by a digital version of said construction set, thereby allowing a user, e.g. a child, to digitally design models without restricting the number of available construction elements, etc., thereby providing for an interesting playing experience. It is an advantage of the invention that it provides a method and system which allows to realistically model even complex connectivity properties of a physical construction set and, at the same time, provides an efficient modeling process. Consequently, a user experiences an interactive digital construction process without having to wait for the computer to determine whether a proposed position of a construction element corresponds to the connection rules of the construction set.

The method may further be applied to analyze properties of a designed model, to generate construction instructions, or the like. In general, the method may be applied in the computer gaming industry and all other areas of computer graphics where predetermined 3D elements have to be put together according to a plurality of connection rules.

The invention claimed is:

1. A method of generating a computer readable model of a geometrical object constructed from a plurality of interconnectable construction elements, wherein each construction element has a number of connection elements for connecting the construction element with another construction element comprising encoding a first and a second one of the plurality of construction elements as corresponding first and second data structures, each representing the connection elements of the corresponding construction element, and each of the connection elements having associated with it one of a plurality of predetermined connection types;

determining a first connection element of the first construction element and a second connection element of the second construction element located in a predetermined proximity of each other; and retrieving connectivity information of the corresponding connection types of the first and second connection elements indicative of whether the first and second connection elements provide a connection between the first and the second construction element.

2. A method according to claim 1, characterised in that the method further comprises providing a connection table including connectivity information of pairs of the connection types; and the step of retrieving connectivity information comprises retrieving the connectivity information from the connection table.

3. A method according to claim 1, characterised in that the method further comprises providing a combination table including a resulting connection type for each of a predetermined set of pairs of connection types;

determining a first and a second connection element that are positioned in a predetermined geometric relationship to each other;

retrieving a resulting connection type of the first and second connection elements from the combination table; and assigning the retrieved resulting connection type to at least a resulting connection element.

4. A method according to claim 1, characterised in that each of the respective data structures further represents a number of grids relative to the corresponding construction element, each grid having a number of grid points; and each of the connection elements of the construction element is associated with one of the grid points and has a corresponding connection type.

5. A method according to claim 4, characterised in that each of the grids has at least one grid edge and the method further comprises providing a combination table including a resulting connection type for each pair of connection types;

detecting if a first grid of the first construction element is placed in an edge to edge extension of a second grid of the second construction element, a first edge of the first grid being aligned with a second edge of the second grid;

for a first connection element of the first grid identifying a corresponding second connection element of the second grid;

retrieving a resulting connection type of a combination of the first and second connection elements from the combination table; and assigning the retrieved resulting connection type to the first and second connection elements.

6. A method according to claim 4, characterised in that each of the respective data structures further represents a bounding volume of the corresponding construction element; and each of the grids corresponds to a surface of the bounding volume.

7. A method according to claim 6, characterised in that the method further comprises encoding respective positions of the first and second construction element with respect to a common volume reference grid, the first and second grid of the corresponding first and second construction elements corresponding to respective first and second planes of the volume reference grid; the grid points of the first and second grids corresponding to respective reference grid points of the volume reference grid; and detecting whether the first and second grids correspond to a common plane of the volume reference grid and whether at least a first grid point of the first grid is located in the same reference grid point as a second grid point of the second grid.

8. A method according to claim 7, characterised in that the method further comprises identifying all pairs of coinciding grid points of the first grid and the second grid;

for each of the identified pairs of grid points retrieving connectivity information form the connectivity table;

refusing connection between the first and second construction elements, if at least one pair of grid points corresponds to an invalid connection; otherwise accepting connection between the first and second construction elements, if at least one pair of grid points corresponds to a valid connection.

9. A method according to claim 1, characterised in that each of the connection elements further has an associated direction.

10. A method according to claim 1, characterised in that the connectivity information comprises an indicator for each pair of connection types indicating one of a predetermined group of connectivity types, the group consisting of a valid connection which provides a connection between a corresponding pair of connection elements, an invalid connection which prevents a connection between a corresponding pair of connection elements, and an indifferent connection.

11. A method according to any one of claim 1, characterised in that the step of determining a first connection element of the first construction element and a second connection element of the second construction element located in a predetermined proximity of each other further comprises determining the first and second connection elements from a predetermined subset of connection elements.

12. A method according to claim 11, characterised in that each of the respective data structures further represents a bounding volume of the corresponding construction element; the method further comprises detecting an intersection of the bounding volumes of the first and second construction elements; and the step of determining the first and second connection elements from a predetermined subset of connection elements comprises determining the first and second connection elements from connection elements comprised in the determined intersection.

13. A data processing system comprising means for generating a computer readable model of a geometrical object constructed from a plurality of interconnected construction elements, wherein each construction element has a number of connection elements for connecting the construction element with another construction element;

means for encoding a first and a second one of the plurality of construction elements as corresponding first and second data structures, each representing the connection elements of the corresponding construction element, and each of the connection elements having associated with it one of a plurality of predetermined connection types;

means for determining a first connection element of the first construction element and a second connection element of the second construction element located in a predetermined proximity of each other; and means for retrieving connectivity information of the corresponding connection types of the first and second connection element indicative of whether the first and second connection elements provide a connection between the first and the second construction element.

14. A data processing system according to claim 13, characterised in that the data processing system further comprises storage means for storing a connection table including connectivity information of pairs of the connection types.

15. A data processing system according to claim 13, characterised in that the data processing system further comprises storage means for storing a combination table including a resulting connection type for each of a predetermined set of pairs of connection types.

16. A method according to claim 1 wherein each of said steps is performed by a computer program running on a computer.

17. A computer program product comprising program code means stored on a computer readable medium for generating a computer readable model of a geometrical object constructed from a plurality of interconnectable construction elements, wherein each construction element has a number of connection elements for connecting the construction element with another construction element-comprising encoding a first and a second one of the plurality of construction elements as corresponding first and second data structures, each representing the connection elements of the corresponding construction element, and each of the connection elements having associated with it one of a plurality of predetermined connection types;

determining a first connection element of the first construction element and a second connection element of the second construction element located in a predetermined proximity of each other; and retrieving connectivity information of the corresponding connection types of the first and second connection elements indicative of whether the first and second connection elements provide a connection between the first and the second construction element.

18. A method according to claim 1, wherein the connectivity information is indicative of a connection property of respective pairs of said plurality of connection types.

19. A method according to claim 1, wherein the connectivity information is indicative, for each pair of connection types, whether two connection elements of respective construction elements, the two connection elements having respective ones of said pair of connection types, are adapted to engage with each other so as to provide a connection between the respective construction elements.

20. A method according to claim 18, further comprising determining whether the first and second connection elements engage to provide a connection between the first and second construction elements based on the retrieved connectivity information of the pair of connection types of the first and second connection elements.

* * * * *